United States Patent
Hantz et al.

(10) Patent No.: US 11,353,057 B2
(45) Date of Patent: Jun. 7, 2022

(54) JOURNAL AND THRUST GAS BEARING

(71) Applicant: Elliott Company, Jeannette, PA (US)

(72) Inventors: Brian Douglas Hantz, Latrobe, PA (US); Klaus Brun, Export, PA (US); Wei Li, Delmont, PA (US); Brian Christopher Pettinato, Greensburg, PA (US); Manish Rambhau Thorat, Monroeville, PA (US); Qingyu Wang, Trafford, PA (US)

(73) Assignee: Elliott Company, Jeannette, PA (US)

( * ) Notice: Subject to any disclaimer, the term of this patent is extended or adjusted under 35 U.S.C. 154(b) by 117 days.

(21) Appl. No.: 17/017,034

(22) Filed: Sep. 10, 2020

(65) Prior Publication Data

US 2021/0164516 A1    Jun. 3, 2021

Related U.S. Application Data

(60) Provisional application No. 62/942,817, filed on Dec. 3, 2019.

(51) Int. Cl.
*F16C 32/06*     (2006.01)
*F16C 17/04*     (2006.01)
(Continued)

(52) U.S. Cl.
CPC .......... *F16C 17/045* (2013.01); *F01D 25/162* (2013.01); *F04D 29/057* (2013.01);
(Continued)

(58) Field of Classification Search
CPC .... F16C 17/026; F16C 17/045; F16C 17/107; F16C 32/0614; F16C 32/0622; F16C 32/0625; F16C 32/0677; F16C 32/0696; F16C 2360/23; F16C 2360/24; F01D 25/162; F01D 25/164; F04D 29/047;
(Continued)

(56) References Cited

U.S. PATENT DOCUMENTS 3,370,897 A    2/1968   Rylatt
3,968,935 A    7/1976   Sohre
(Continued)

FOREIGN PATENT DOCUMENTS

| CN | 101550864 A | * 10/2009 | |
|---|---|---|---|
| DE | 4436156-01 | * 3/1996 | ........... B23K 26/389 |

(Continued)

OTHER PUBLICATIONS

DE10062016desc_machine_translation.*

*Primary Examiner* — Phillip A Johnson
(74) *Attorney, Agent, or Firm* — The Webb Law Firm

(57) ABSTRACT

A bearing includes a thrust gas bearing attached to a journal bearing and two or more converging-diverging orifices defined in a surface of at least one of the thrust gas bearing and the journal bearing. The converging-diverging orifices supply at least one pressurized gas to an interior of the bearing. Hydrodynamic lifting grooves are provided on the faces of the thrust gas bearing and the journal bearing and provide improved load capacity and sealing capabilities. Control over the ratios of the pressurized gases provides for additional sealing capabilities and reduced leakage. A metal mesh damper provides increased damping of the gas bearing.

18 Claims, 6 Drawing Sheets

(51) Int. Cl.
*F01D 25/16* (2006.01)
*F04D 29/057* (2006.01)

(52) U.S. Cl.
CPC ...... *F16C 32/0622* (2013.01); *F16C 32/0696* (2013.01); *F05D 2220/30* (2013.01); *F05D 2240/52* (2013.01); *F05D 2240/53* (2013.01); *F16C 2360/23* (2013.01)

(58) Field of Classification Search
CPC .............. F04D 29/057; F05D 2220/30; F05D 2240/52; F05D 2240/53
See application file for complete search history.

(56) References Cited

U.S. PATENT DOCUMENTS

| | | |
|---|---|---|
| 4,730,977 A | 3/1988 | Haaser |
| 4,734,020 A | 3/1988 | Inaba et al. |
| 4,992,025 A | 2/1991 | Stroud et al. |
| 5,407,281 A | 4/1995 | Chen |
| 5,795,074 A | 8/1998 | Rahman et al. |
| 5,834,094 A | 11/1998 | Etsion et al. |
| 6,056,441 A | 5/2000 | Scharrer et al. |
| 6,460,635 B1 | 10/2002 | Kalsi et al. |
| 7,448,805 B2 | 11/2008 | Kita et al. |
| 7,470,064 B2 | 12/2008 | Link et al. |
| 7,524,113 B2 | 4/2009 | Haga et al. |
| 8,083,413 B2 | 12/2011 | Ertas |
| 8,240,917 B2 | 8/2012 | Engesser et al. |
| 8,333,512 B2 | 12/2012 | Huang et al. |
| 8,366,322 B2 | 2/2013 | Hibi et al. |
| 8,608,386 B2 | 12/2013 | Modtland et al. |
| 8,628,246 B2 | 1/2014 | Aiello |
| 8,668,388 B1 | 3/2014 | Peterson |
| 8,732,954 B2 | 5/2014 | Aiello |
| 8,764,296 B2 | 7/2014 | Omori |
| 8,773,815 B2 | 7/2014 | Aoshima |
| 8,920,033 B2 | 12/2014 | Bauer |
| 8,926,183 B2 | 1/2015 | Noda et al. |
| 8,926,184 B2 | 1/2015 | Flores et al. |
| 8,931,175 B2 | 1/2015 | Mori et al. |
| 9,181,978 B2 | 11/2015 | Leuthold |
| 9,938,982 B1 | 4/2018 | Bischof |
| 10,100,932 B2 | 10/2018 | Devitt |
| 10,184,513 B2 | 1/2019 | Takagi et al. |
| 2002/0122610 A1 | 9/2002 | Shiraishi |
| 2004/0114839 A1 | 6/2004 | Mukai et al. |
| 2006/0051000 A1 | 3/2006 | Etsion et al. |
| 2009/0022438 A1 | 1/2009 | Tamaoka |
| 2009/0110337 A1 | 4/2009 | Jiang et al. |
| 2011/0317950 A1 | 12/2011 | Lee |
| 2012/0306206 A1 | 12/2012 | Agrawal et al. |
| 2013/0142461 A1 | 6/2013 | Yu |
| 2014/0009020 A1 | 1/2014 | Kwon et al. |
| 2014/0023300 A1 | 1/2014 | Grantz et al. |
| 2014/0037233 A1 | 2/2014 | Bauer |
| 2014/0084724 A1 | 3/2014 | Kang |
| 2014/0233873 A1 | 8/2014 | Hayashi et al. |
| 2014/0286599 A1 | 9/2014 | Devitt et al. |
| 2014/0307989 A1 | 10/2014 | Leuthold |
| 2014/0314352 A1 | 10/2014 | Tokunaga |
| 2014/0369631 A1 | 12/2014 | Leuthold et al. |
| 2015/0055898 A1 | 2/2015 | Kayser et al. |
| 2015/0267740 A1* | 9/2015 | Ryu ................ F16C 17/035 384/103 |
| 2015/0267741 A1 | 9/2015 | Chen |
| 2016/0040712 A1 | 2/2016 | Komatsubara et al. |
| 2016/0111124 A1 | 4/2016 | Ku |
| 2016/0131185 A1 | 5/2016 | Tanaka et al. |
| 2016/0153490 A1 | 6/2016 | Saito et al. |
| 2016/0363002 A1 | 12/2016 | Kollenrott et al. |
| 2018/0073560 A1 | 3/2018 | Karpetis et al. |

FOREIGN PATENT DOCUMENTS

| | | | |
|---|---|---|---|
| DE | 10062106 A1 * | 6/2002 | .......... F16C 32/0622 |
| DE | 102010001538 A1 * | 8/2011 | ............ F04D 17/16 |
| EP | 0365195 A2 | 4/1990 | |
| GB | 2046370 A * | 11/1980 | ............ F16C 17/02 |
| JP | 8232885 A | 9/1996 | |

* cited by examiner

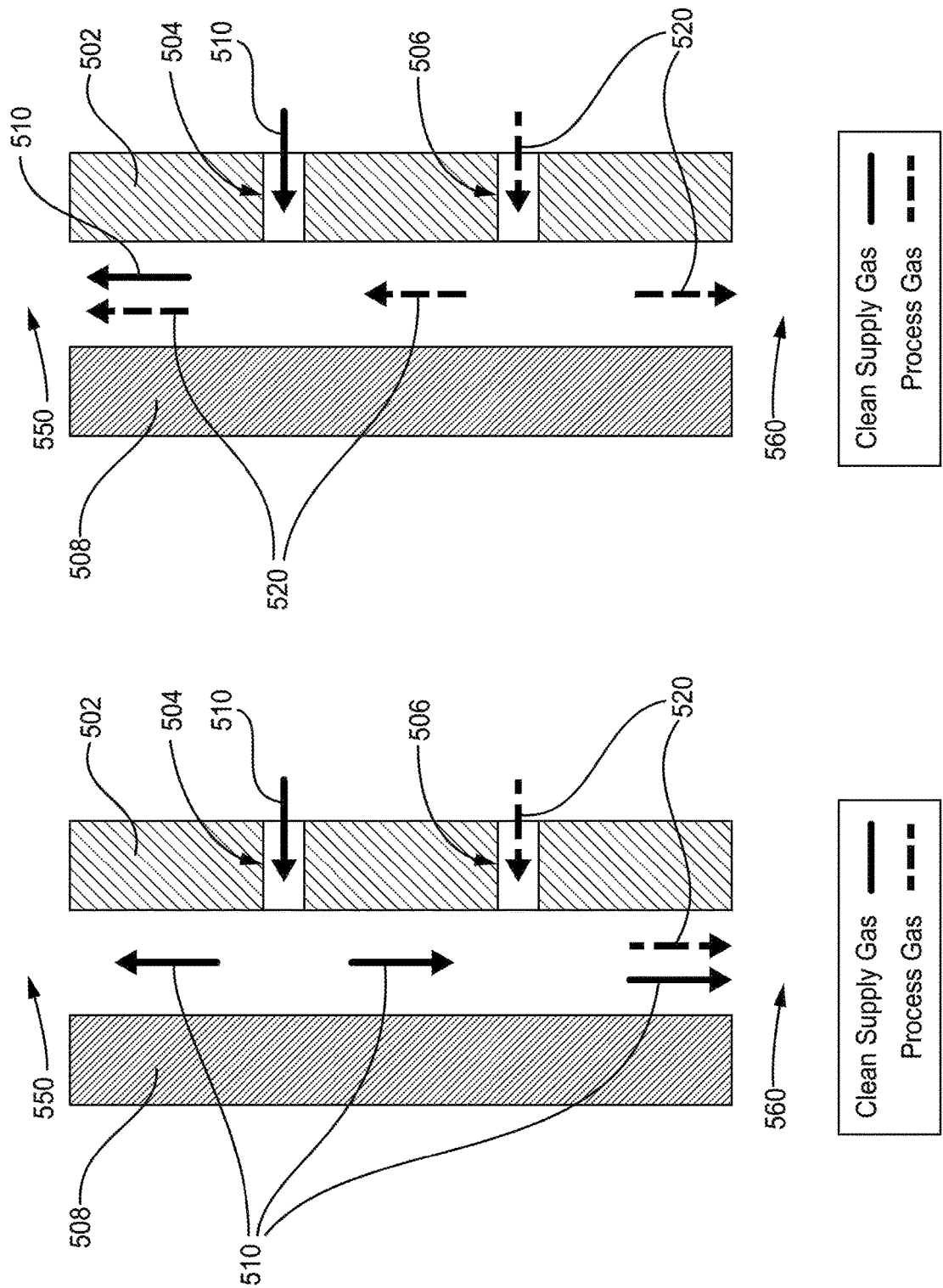

JOURNAL AND THRUST GAS BEARING

CROSS REFERENCE TO RELATED APPLICATIONS

The present application claims priority to U.S. Provisional Patent Application No. 62/942,817, filed on Dec. 3, 2019, which is incorporated herein by reference in its entirety.

BACKGROUND OF THE INVENTION

Field of the Invention

The present disclosure relates generally to thrust and journal bearings, and more particularly, to a joined journal and thrust gas bearing with converging-diverging orifice geometries, as well as a turbomachine that operates with the bearing.

Description of Related Art

Turbomachines, such as centrifugal flow compressors, axial flow compressors, and turbines, may be utilized in various industries. Centrifugal flow compressors and turbines, in particular, have a widespread use in power stations, jet engine applications, gas turbines, and automotive applications. Centrifugal flow compressors and turbines are also commonly used in large-scale industrial applications, such as air separation plants and hot gas expanders used in the oil refinery industry. Centrifugal compressors are further used in large-scale industrial applications, such as refineries and chemical plants.

With reference to FIG. 1, a multi-stage, centrifugal-flow turbomachine 10 is illustrated in accordance with a conventional design. In some applications, a single stage may be utilized. In other applications, multiple stages may be utilized. Such a turbomachine 10 generally includes a shaft 20 supported within a housing 30 by a pair of bearings 40. The turbomachine 10 shown in FIG. 1 includes a plurality of stages to progressively increase the pressure of the working fluid. Each stage is successively arranged along the longitudinal axis of turbomachine 10, and all stages may or may not have similar components operating on the same principle.

With continued reference to FIG. 1, an impeller 50 includes a plurality of rotating blades 60 circumferentially arranged and attached to an impeller hub 70 which is, in turn, attached to the shaft 20. The blades 60 may be optionally attached to a cover 65. A plurality of impellers 50 may be spaced apart in multiple stages along the axial length of the shaft 20. The rotating blades 60 are fixedly coupled to the impeller hub 70 such that the rotating blades 60, along with the impeller hub 70, rotate with the rotation of the shaft 20. The rotating blades 60 rotate downstream of a plurality of stationary vanes or stators 80 attached to a stationary tubular casing. The working fluid, such as a gas mixture, enters and exits the turbomachine 10 in the radial direction of the shaft 20. The rotating blades 60 are rotated with respect to the stators 80 using mechanical power, which is transferred to the fluid. In a centrifugal compressor, the cross-sectional area between the rotating blades 60 within the impeller 50 decreases from an inlet end to a discharge end, such that the working fluid is compressed as it passes through the impeller 50.

Referring to FIG. 2, working fluid, such as a gas mixture, moves from an inlet end 90 to an outlet end 100 of the turbomachine 10. A row of stators 80 provided at the inlet end 90 channels the working fluid into a row of rotating blades 60 of the turbomachine 10. The stators 80 extend within the casing for channeling the working fluid to the rotating blades 60. The stators 80 are spaced apart circumferentially with generally equal spacing between individual struts around the perimeter of the casing. A diffuser 110 is provided at the outlet of the rotating blades 60 for converting excess kinetic energy into a pressure rise from the fluid flow coming off the rotating blades 60. The diffuser 110 optionally has a plurality of diffuser blades 120 extending within a casing. The diffuser blades 120 are spaced apart circumferentially, typically with equal spacing between individual diffuser blades 120 around the perimeter of the diffuser casing. In a multi-stage turbomachine 10, a plurality of return channel vanes 125 are provided at the outlet end 100 of a fluid compression stage for channeling the working fluid to the rotating blades 60 of the next successive stage. In such an embodiment, the return channel vanes 125 provide the function of the stators 80 from the first stage of turbomachine 10. The last impeller in a multi-stage turbomachine 10 typically only has a diffuser, which may be provided with or without the diffuser blades 120. The last diffuser channels the flow of working fluid to a discharge casing (volute) having an exit flange for connecting to the discharge pipe. As shown in FIG. 2, in a single-stage embodiment, the turbomachine 10 includes stators 80 at the inlet end 90 and a diffuser 110 at the outlet end 100.

The purpose of bearings in turbomachinery applications is to reliably support a spinning rotor with minimal friction and to provide necessary stiffness and damping characteristics for low vibration. The vast majority of bearings for turbomachinery utilize oil for this purpose. Gas bearings are bearings in which gas, rather than oil, is the working fluid to achieve this separation between the rotor and bearing surfaces. This eliminates the need for oil lubrication.

Gas bearings of various designs have been studied in the turbomachinery industry for decades. Turbomachinery utilizes both journal bearings and thrust gas bearings. Typically in turbomachinery, the thrust gas bearings and journal bearings are separated from each other. Gas bearings are of particular interest for turbomachinery due to cleanliness, wider allowable temperature ranges without lubricant circulation systems, and potentially lower cost and maintenance. A typical gas-lubricated bearing can be hydrodynamic or hydrostatic.

Hydrodynamic gas bearings, such as foil bearings, are bearings that rely on the relatively high speed of the rotating shaft journal to pull and pressurize air between the shaft and bearing faces to generate separation between the surfaces. However, relatively high surface speeds and/or journal diameters are required to generate the load-carrying capacity for many heavy turbomachinery applications. Additionally, the rotor cannot be supported at lower speeds by hydrodynamic means, which can lead to limited bearing lifespans from contact during startups and shutdowns.

Hydrostatic bearings, on the other hand, are externally pressurized. In a hydrostatic bearing, the working fluid is pressurized external to the bearing (typically by a separate compressor or pump) and delivered to the space between the shaft and bearing faces. With sufficient supply pressure, the supply gas can support the rotor on a thin gas film at all speeds (even when stationary). The lower viscosity of gases compared to oil lubricants allows for near friction-less rotation compared to traditional oil-film bearings. The gases can escape from the bearings, resulting in leakage of the supplied gas.

Hydrostatic bearings also have reduced damping for traversing lateral natural frequencies of the rotor bearing system compared to hydrodynamic bearings. Hydrodynamic bearings with metal mesh backing have been shown to increase damping characteristics of the hydrodynamic bearings.

The pressurized airflow in hydrostatic gas bearings is often restricted. The restriction refers to the act of restricting the air flow from the supply to the gap. By doing this, a reserve pressure is created behind the gap. When the load increases at one orifice, the gap will decrease. Because a reserve pressure exists, the pressure at the loaded orifice can increase to compensate for this additional load. This restriction and compensation gives a hydrostatic gas bearing stiffness.

SUMMARY OF THE INVENTION

According to an example of the present disclosure, improved bearings for use in turbomachines are provided. The improved bearings may be configured to reduce air leakage through the bearings, decrease the amount of the footprint of the bearings, increase the gap pressure in the bearings, and/or increase the damping characteristics of the bearings in comparison with the current art.

According to another example of the present disclosure, a bearing which addresses each of the above-mentioned improvements, combined into a single bearing, is provided. According to the example, the bearing may be made of a thrust gas bearing attached to a journal bearing. Combining the thrust and journal bearings in this manner results in a smaller footprint for the combined bearing.

According to a particular example of the present disclosure, a bearing is provided. The bearing comprises a thrust gas bearing attached to a journal bearing; and two or more converging-diverging orifices defined in a surface of at least one of the thrust gas bearing and the journal bearing. The converging-diverging orifices supply at least one pressurized gas to an interior of the bearing.

The at least one pressurized gas may comprise a process gas.

The converging-diverging orifices may each comprise a throat, each orifice being configured to cause a flow of at least one pressurized gas in the throat of the orifice to have a velocity of Mach 1 and to cause a flow of the at least one pressurized gas beyond the throat to have a supersonic velocity.

The thrust gas bearing may comprise hydrodynamic lifting grooves on a surface of the thrust gas bearing, the hydrodynamic lifting grooves being configured to create a gas seal.

The thrust gas bearing may be configured to accommodate a hydrostatic injection of the at least one pressurized gas to form a gas seal within the thrust gas bearing.

An edge of an inner surface of the journal bearing may comprise a plurality of grooves defined therein, the grooves having a geometry that creates a high pressure region at the edge of the journal bearing.

The converging-diverging orifices may comprise at least one inboard orifice and at least one outboard orifice. The at least one pressurized gas may comprise a process gas supplied through the at least one inboard orifice and a clean air gas supplied through the at least one outboard orifice. When the process gas has a higher pressure than the clean air gas, the process gas prevents the clean air gas from leaking into the bearing.

The converging-diverging orifices may comprise at least one inboard orifice and at least one outboard orifice. The at least one pressurized gas may comprise a process gas supplied through the at least one inboard orifice and a clean air gas supplied through the at least one outboard orifice. When the clean air gas has a higher pressure than the process gas, the clean air gas prevents the process gas from leaking out of the bearing.

The converging-diverging orifices may comprise at least one inboard orifice, at least one outboard orifice, and at least one seal gas orifice located between the at least one inboard orifice and the at least one outboard orifice. The at least one pressurized gas may comprise a process gas supplied through the at least one inboard orifice, a clean air gas supplied through the at least one outboard orifice, and a seal gas supplied through the at least one seal gas orifice. When the seal gas has a higher pressure than the process gas and the clean air gas, the seal gas prevents the process gas from leaking out of the bearing.

A metal mesh damper may be provided on an outside surface of the bearing.

According to a particular example of the present disclosure, a turbomachine is provided. The turbomachine comprises a casing having an inlet end and an outlet end opposite the inlet end along a longitudinal axis of the casing; a shaft disposed within the casing, the shaft extending from the inlet end to the outlet end of the casing; at least one rotor extending radially outward from the shaft; and at least one bearing. The bearing comprises a thrust gas bearing attached to a journal bearing; and two or more converging-diverging orifices defined in a surface of at least one of the thrust gas bearing and the journal bearing. The converging-diverging orifices supply at least one pressurized gas to an interior of the bearing. The rotor is encased within the thrust gas bearing. The shaft is at least partially encased within the journal bearing.

The at least one pressurized gas may comprise a process gas.

The converging-diverging orifices may each comprise a throat, each orifice being configured to cause a flow of at least one pressurized gas in the throat of the orifice to have a velocity of Mach 1 and to cause a flow of the at least one pressurized gas beyond the throat to have a supersonic velocity.

The thrust gas bearing may comprise hydrodynamic lifting grooves on a surface of the thrust gas bearing, the hydrodynamic lifting grooves being configured to create a gas seal.

The thrust gas bearing may be configured to accommodate a hydrostatic injection of the at least one pressurized gas to form a gas seal within the thrust gas bearing.

An edge of an inner surface of the journal bearing may comprise a plurality of grooves defined therein, the grooves having a geometry that creates a high pressure region at the edge of the journal bearing.

The converging-diverging orifices may comprise at least one inboard orifice and at least one outboard orifice. The at least one pressurized gas may comprise a process gas supplied through the at least one inboard orifice and a clean air gas supplied through the at least one outboard orifice. When the process gas has a higher pressure than the clean air gas, the process gas prevents the clean air gas from leaking into the bearing.

The converging-diverging orifices may comprise at least one inboard orifice and at least one outboard orifice. The at least one pressurized gas may comprise a process gas supplied through the at least one inboard orifice and a clean air gas supplied through the at least one outboard orifice. When the clean air gas has a higher pressure than the process gas, the clean air gas prevents the process gas from leaking out of the bearing.

The converging-diverging orifices may comprise at least one inboard orifice, at least one outboard orifice, and at least one seal gas orifice located between the at least one inboard orifice and the at least one outboard orifice. The at least one pressurized gas may comprise a process gas supplied through the at least one inboard orifice, a clean air gas supplied through the at least one outboard orifice, and a seal gas supplied through the at least one seal gas orifice. When the seal gas has a higher pressure than the process gas and the clean air gas, the seal gas prevents the process gas from leaking out of the bearing.

A metal mesh damper may be provided on an outside surface of the bearing.

The turbomachine may further comprise a metal mesh damper provided on an outside surface of the bearing.

Further preferred and non-limiting embodiments or aspects will now be described in the following numbered clauses.

Clause 1: A bearing, comprising: a thrust gas bearing attached to a journal bearing; and two or more converging-diverging orifices defined in a surface of at least one of the thrust gas bearing and the journal bearing, wherein the converging-diverging orifices supply at least one pressurized gas to an interior of the bearing.

Clause 2: The bearing according to clause 1, wherein the at least one pressurized gas comprises a process gas.

Clause 3: The bearing according to clause 1 or clause 2, wherein the converging-diverging orifices each comprise a throat, each orifice being configured to cause a flow of at least one pressurized gas in the throat of the orifice to have a velocity of Mach 1 and to cause a flow of the at least one pressurized gas beyond the throat to have a supersonic velocity.

Clause 4: The bearing according to any one of clauses 1-3, wherein the thrust gas bearing comprises hydrodynamic lifting grooves on a surface of the thrust gas bearing, the hydrodynamic lifting grooves being configured to create a gas seal.

Clause 5: The bearing according to any one of clauses 1-4, wherein the thrust gas bearing is configured to accommodate a hydrostatic injection of the at least one pressurized gas to form a gas seal within the thrust gas bearing.

Clause 6: The bearing according to any one of clauses 1-5, wherein an edge of an inner surface of the journal bearing comprises a plurality of grooves defined therein, the grooves having a geometry that creates a high pressure region at the edge of the journal bearing.

Clause 7: The bearing according to any one of clauses 1-6, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the process gas has a higher pressure than the clean air gas, the process gas prevents the clean air gas from leaking into the bearing.

Clause 8: The bearing according to any one of clauses 1-7, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the clean air gas has a higher pressure than the process gas, the clean air gas prevents the process gas from leaking out of the bearing.

Clause 9: The bearing according to any one of clauses 1-8, wherein the converging-diverging orifices comprise at least one inboard orifice, at least one outboard orifice, and at least one seal gas orifice located between the at least one inboard orifice and the at least outboard orifice, and the at least one pressurized gas comprises a process gas supplied through the at least one inboard orifice, a clean air gas supplied through the at least one outboard orifice, and a seal gas supplied through the at least one seal gas orifice, and wherein when the seal gas has a higher pressure than the process gas and the clean air gas, the seal gas prevents the process gas from leaking out of the bearing.

Clause 10: The bearing according to any one of clauses 1-9, wherein a metal mesh damper is provided on an outside surface of the bearing.

Clause 11: A turbomachine, comprising: a casing having an inlet end and an outlet end opposite the inlet end along a longitudinal axis of the casing; a shaft disposed within the casing, the shaft extending from the inlet end to the outlet end of the casing; at least one rotor extending radially outward from the shaft; and at least one bearing, the at least one bearing comprising: a thrust gas bearing attached to a journal bearing; and two or more converging-diverging orifices defined in a surface of at least one of the thrust gas bearing and the journal bearing, wherein the converging-diverging orifices supply at least one pressurized gas to an interior of the bearing, wherein the rotor is encased within the thrust gas bearing, and wherein the shaft is at least partially encased within the journal bearing.

Clause 12: The turbomachine according to clause 11, wherein the at least one pressurized gas comprises a process gas.

Clause 13: The turbomachine according to clause 11 or clause 12, wherein the converging-diverging orifices each comprise a throat, each orifice being configured to cause a flow of at least one pressurized gas in the throat of the orifice to have a velocity of Mach 1 and to cause a flow of the at least one pressurized gas beyond the throat to have a supersonic velocity.

Clause 14: The turbomachine according to any one of clauses 11-13, wherein the thrust gas bearing comprises hydrodynamic lifting grooves on a surface of the thrust gas bearing, the hydrodynamic lifting grooves being configured to create a gas seal.

Clause 15: The turbomachine according to any one of clauses 11-14, wherein the thrust gas bearing is configured to accommodate a hydrostatic injection of the at least one pressurized gas to form a gas seal within the thrust gas bearing.

Clause 16: The turbomachine according to any one clauses 11-15, wherein an edge of an inner surface of the journal bearing comprises a plurality of grooves defined therein, the grooves having a geometry that creates a high pressure region at the edge of the journal bearing.

Clause 17: The turbomachine according to any one of clauses 11-16, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the process gas has a higher pressure than the clean air gas, the process gas prevents the clean air gas from leaking into the bearing.

Clause 18: The turbomachine according to any one of clauses 11-17, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the clean air gas has a higher pressure than the process gas, the clean air gas prevents the process gas from leaking out of the bearing.

Clause 19: The turbomachine according to any one of clauses 11-18, wherein the converging-diverging orifices comprise at least one inboard orifice, at least one outboard orifice, and at least one seal gas orifice located between the at least one inboard orifice and the at least one outboard orifice, and the at least one pressurized gas comprises a process gas supplied through the at least one inboard orifice, a clean air gas supplied through the at least one outboard orifice, and a seal gas supplied through the at least one seal gas orifice, and wherein when the seal gas has a higher pressure than the process gas and the clean air gas, the seal gas prevents the process gas from leaking out of the bearing.

Clause 20: The turbomachine according to any one of clauses 11-19, further comprising a metal mesh damper provided on an outside surface of the bearing.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular forms of "a", "an", and "the" include plural referents unless the context clearly dictates otherwise.

BRIEF DESCRIPTION OF THE DRAWINGS

FIG. 5A is a cross-sectional view of the orifice air flow direction in the journal and thrust gas bearing of FIG. 3 with higher clean air pressure;

FIG. 5B is a cross-sectional view of the orifice air flow direction in the journal and thrust gas bearing of FIG. 3 with higher process gas pressure.

DETAILED DESCRIPTION OF THE INVENTION

Figure 1:
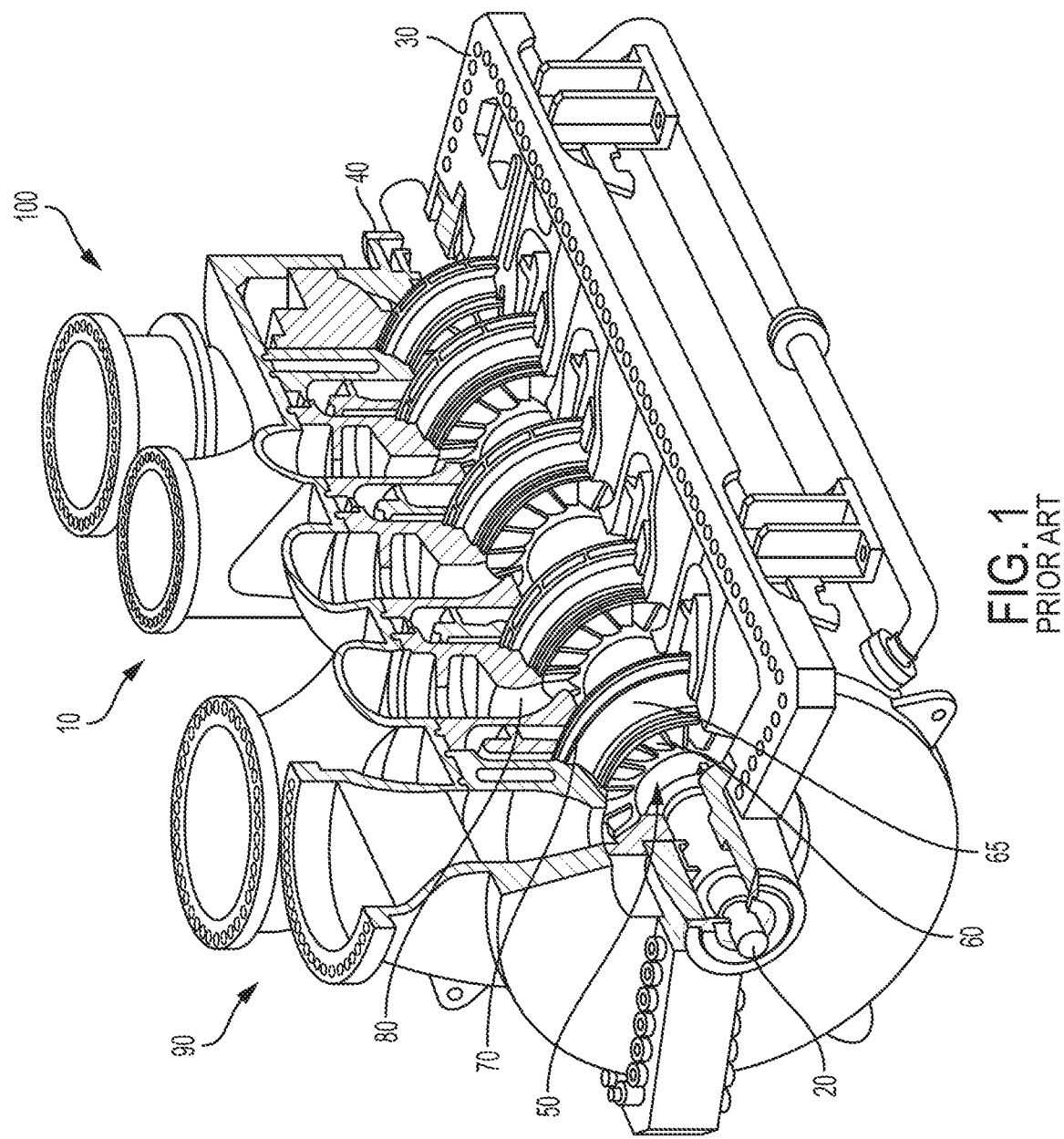
FIG. 1 is a partial-cutaway perspective view of a multi-stage, centrifugal-flow turbomachine in accordance with a prior art example.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

Figure 3:
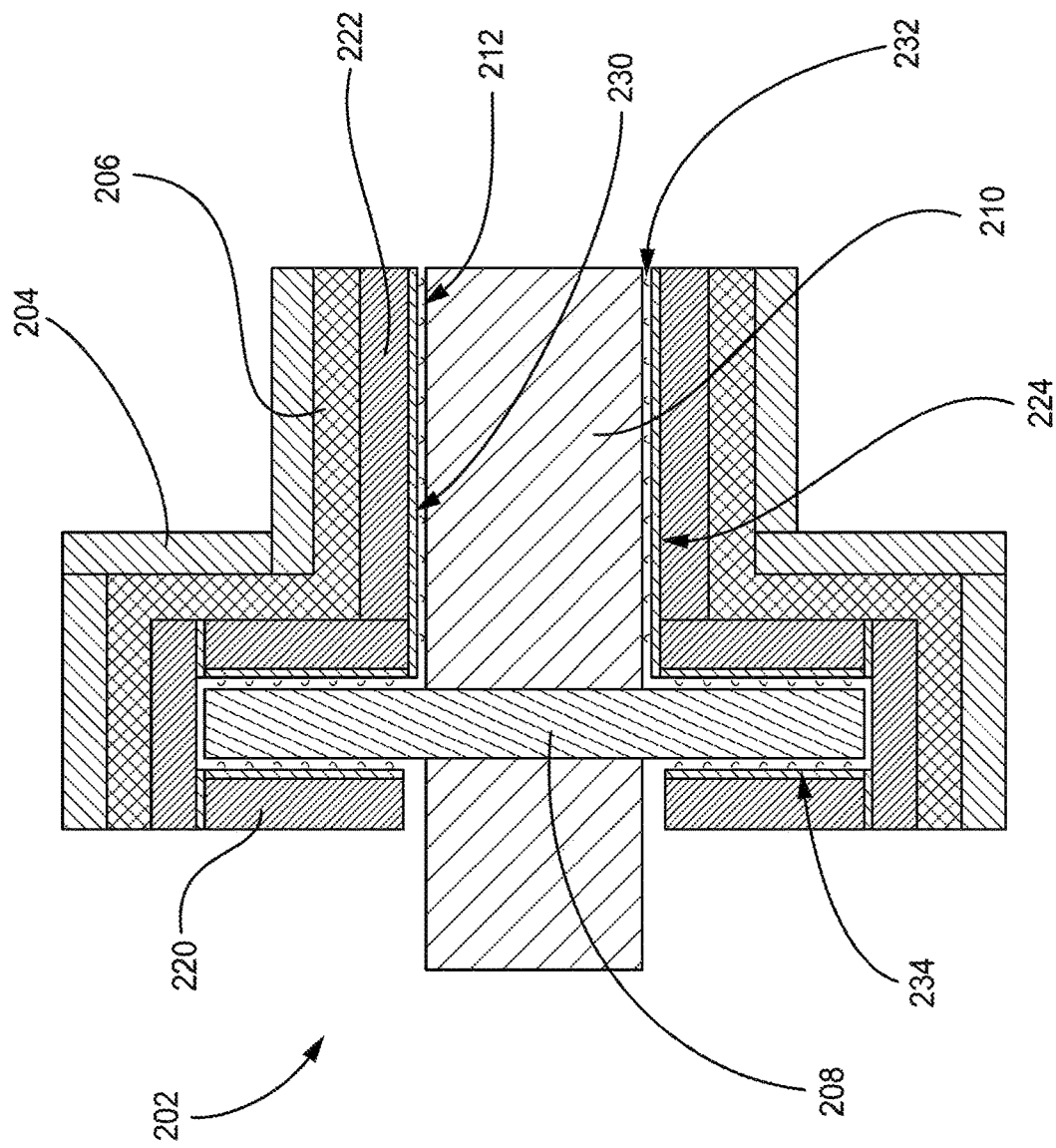
FIG. 3 is a cross-sectional view of a journal and thrust gas bearing according to an example of the present disclosure.
Figure 4:
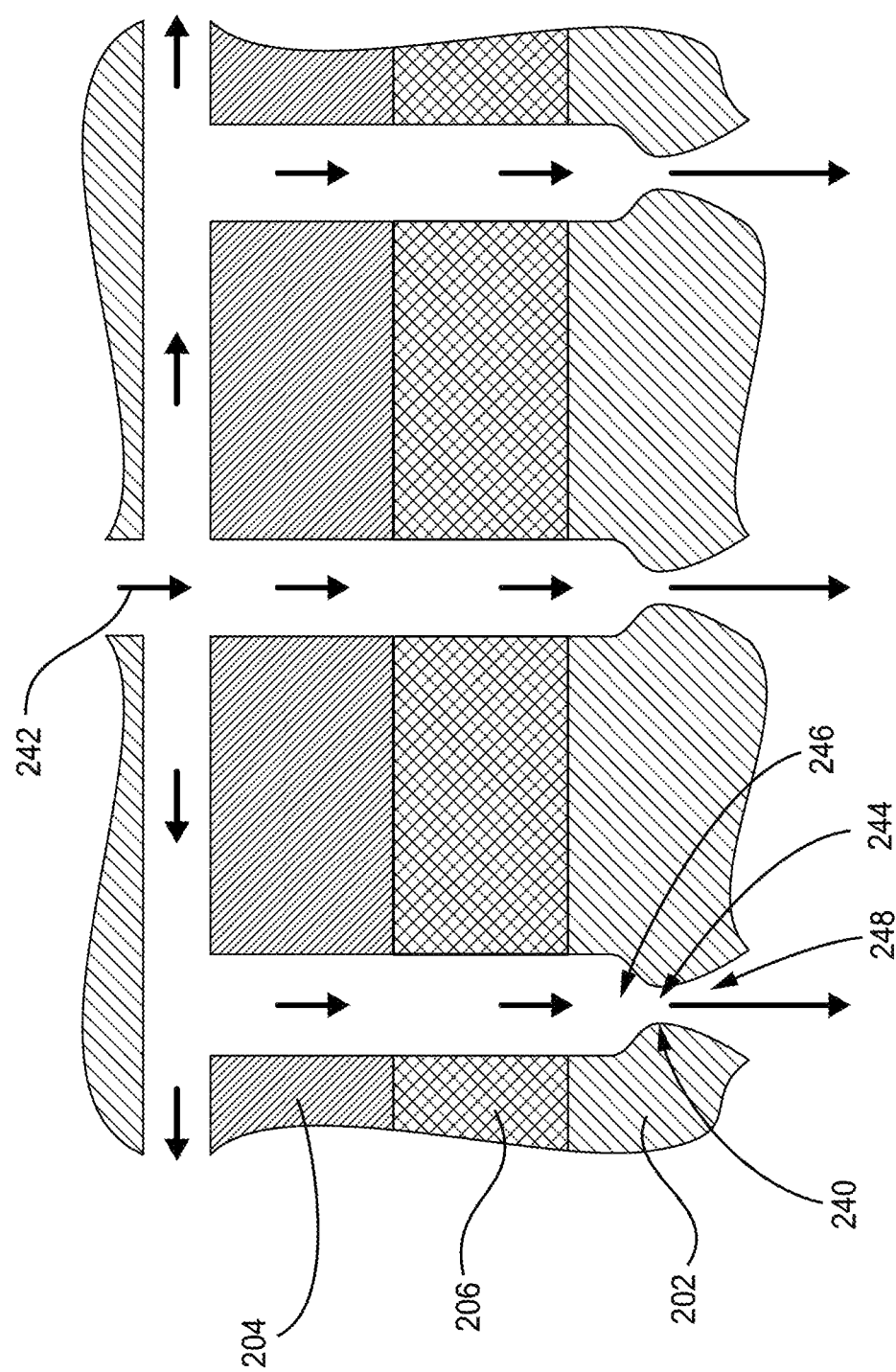
FIG. 4 is a cross-sectional view of the converging-diverging orifice geometries in the journal and thrust gas bearing of FIG. 3.

With reference to FIGS. 3 and 4, a bearing 202 is shown in accordance with an example of the present disclosure. The bearing 202 includes a journal bearing 222 and a thrust gas bearing 220. A plurality of orifices 240 having converging-diverging geometries are defined in one or more surfaces of the bearing 202. One or more surfaces of the bearing 202 are provided with sealing capability.

Figure 2:
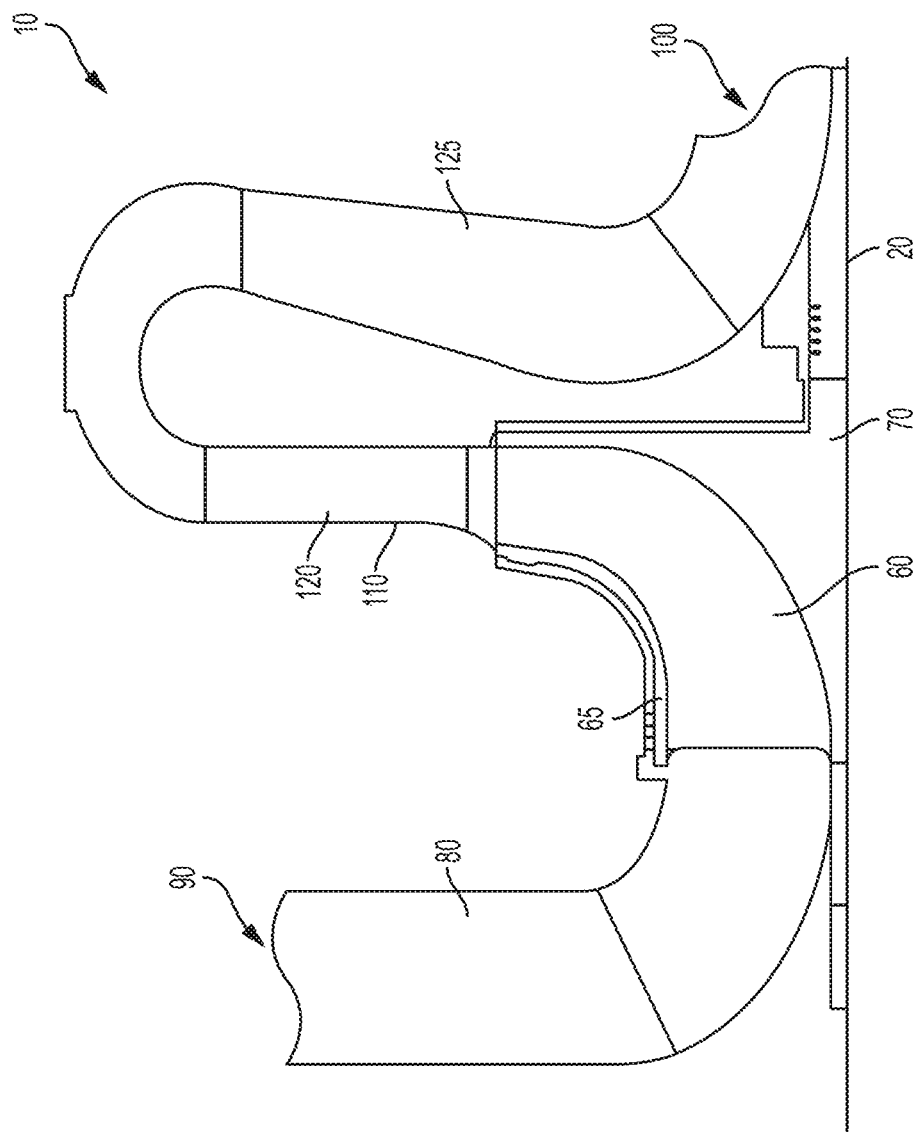
FIG. 2 is a schematic cross-sectional view of one stage of the turbomachine shown in FIG. 1.

According to an example of the present disclosure, a turbomachine is provided that utilizes the bearing 202 illustrated in FIGS. 3 and 4. The bearing 202 is contained within a casing 204 of a turbomachine, which may be of the same type or of a similar type to the turbomachine 10 described above with reference to FIGS. 1 and 2. A single stage of the turbomachine is illustrated in FIG. 3. In addition to the bearing 202, the turbomachine includes the casing 204 having an inlet end and an outlet end opposite to the inlet end along a longitudinal axis of the casing 204, as described above with reference to the turbomachine 10 illustrated in FIGS. 1 and 2, a shaft 210 disposed within the casing 204 and extending from the inlet end to the outlet end of the casing 204, and at least one rotor 208 extending radially outward from the shaft 210. It is to be appreciated that the structure of the bearing 202 and the components illustrated in FIG. 3 may be utilized in connection with multi-stage turbomachines, such as a multi-stage, centrifugal-flow compressor. A plurality of bearings 202 may be spaced apart in multiple stages along the axial length of the shaft 210.

As shown in FIGS. 3 and 4, the bearing 202 includes the thrust gas bearing 220 attached to the journal bearing 222. The thrust gas bearing 220 provides support to loads in both axial directions. The thrust gas bearing 220 may be a double acting thrust gas bearing. The thrust gas bearing 220 may be joined to the end of the journal bearing 222. According to an example, the thrust gas bearing 222 is configured to create or accommodate a hydrostatic injection of a pressurized gas or gases within the thrust gas bearing 220, which can be used to create a dry gas seal within the thrust gas bearing 220. The bearing 202 can be utilized by placing the shaft 210 connected to the rotor 208 within the bearing 202 such that the shaft 210 is at least partially located or encased within the journal bearing 222 and the rotor 208 is located or encased within the thrust gas bearing 220. According to an example, a casing 204 encloses the bearing 202.

The hydrostatic injection of pressurized gas creates a gas film 212 surrounding the shaft 210 and the rotor 208. According to an example, grooves 230 having a hydrodynamic lifting geometry are placed on the inner surface 224 of the journal bearing 222. The grooves 230 on the journal bearing inner surface 224 improve load capacity of the pressurized gas, resulting in a decrease in gas necessary to maintain the load of the shaft 210 and rotor 208. According to an example, the pressurized gas being injected into the bearing 202 is the working fluid of a compressor, known as process gas. According to an example, multiple pressurized gases are injected into the bearing 202 through multiple orifices. These gases may include clean air gas or a seal gas.

As shown in FIG. 4, prior to reaching the journal bearing inner surface 224, the pressurized gas flow 242 may be restricted. In a typical hydrostatic gas bearing design, restrictors are usually designed such that about 50% of the supply pressure is available in the gap. According to an example, the restrictors may be designed to allow more than 50% of the supply pressure in the gap. According to an example, the restrictors may be designed to allow less than 50% of the supply pressure in the gap. According to an example, the bearing design may utilize an orifice 240 to restrict the gas flow. The orifice 240 may have a converging-diverging design. In a converging-diverging nozzle, the gas flow 242 enters a converging chamber 246 where the cross-sectional area is reduced to a minimum at a throat 244. The throat 244 size is designed such that the flow is choked, e.g., the flow is sonic (Mach number=1). After passing through the throat 244, the flow may be isentropically expanded in a chamber of diverging cross-sectional area 248 to supersonic velocity. This increases the fluid velocity at the orifice exit compared to traditional rectangular or circular orifice designs.

Because the dynamic pressure experienced by the surface of the rotor 208 is proportional to the velocity of the fluid squared, maximizing the fluid velocity exiting the orifice also maximizes the dynamic pressure, and thus load capacity, of a hydrostatic gas bearing for a given supply gas pressure. This effect reduces the required gas flow 242 pressure compared to simple rectangular or circular orifice gas bearings. The orifice 240 may be located in various positions along the surfaces of the bearing 202. According to an example, multiple orifices 240 may be placed at multiple locations along the surfaces of the bearing 202. According to a particular example, the orifices 240 may be located in one or more surfaces of the thrust gas bearing 220. According to another particular example, the orifices 240 may be located in one or more surfaces of the journal bearing 222. According to another particular example, the orifices 240 may be located in one or more surfaces of both the thrust gas bearing 220 and the journal bearing 222. It is to be appreciated that the orifice 240 may be designed to have alternative geometries different from the above-described converging-diverging design found to be suitable to those having ordinary skill in the art.

With reference to FIG. 3, according to an example of the present disclosure, hydrodynamic lifting grooves 234 are provided on the inner surface of the thrust gas bearing 220. The grooves 234 are configured to provide a sealing capability similar to dry gas seals. The lifting geometry of the grooves 234 generates a fluid-dynamic lifting force that creates a high pressure gap between the thrust gas bearing 220 and the rotor 208 at operational speeds. This not only decreases the supply pressure requirements at running speed, but also adds sealing capability to the thrust gas bearing 220.

According to an example, the sealing capability of the thrust gas bearing 220 can be improved by controlling the pressure ratio of process gas (the working fluid in the compressor) to clean air gas at different orifices 240. The sealing capability of the journal bearing 222 may also be improved by controlling the pressure ratio of the process gas to clean air gas at different orifices 240. According to an example, multiple orifices 240 are located on the bearing 202 such that one or more orifices 240 are designated as inboard orifices and one or more orifices 240 are designated as outboard orifices. According to a particular example, the bearing 202 includes one inboard orifice, two inboard orifices, three inboard orifices, or more than three inboard orifices. According to another particular example, the bearing 202 includes one outboard orifice, two outboard orifices, three outboard orifices, or more than three outboard orifices. Inboard orifices refer to orifices that are supplied by process gas. Outboard orifices refer to orifices supplied by clean air, seal gases, or other gases. The outboard orifices may be located closer to the outside edges of the bearing 202 than the inboard orifices. The orifices may be converging-diverging orifices. The orifices may also be of an alternative orifice design other than converging-diverging orifices found to be suitable by those having ordinary skill in the art.

As shown in FIG. 3, grooves 232 may be added to the edge of the inner surface 224 of the journal bearing 222 to act as seals and reduce leakage. The journal bearing edge grooves 232 are arranged to direct gas such that a high pressure region at the edge of the journal bearing 222 will be created. This pressure build-up at the bearing edge acts as a buffer for the supply gas and reduces leakage.

According to an example, a metal mesh damper 206 is placed between the casing 204 and either or both of the thrust gas bearing 220 and the journal bearing 222 to improve the damping characteristic of the bearing 202. The metal mesh damper 206 will provide damping to the bearing 202 when traversing lateral natural frequencies of the rotor bearing system. The metal mesh damper 206 is contained within the casing 204 that encases the bearing 202 and the metal mesh damper 206. According to another example, the casing encases the bearing 202 without the inclusion of the metal mesh damper 206.

Figure 5C:
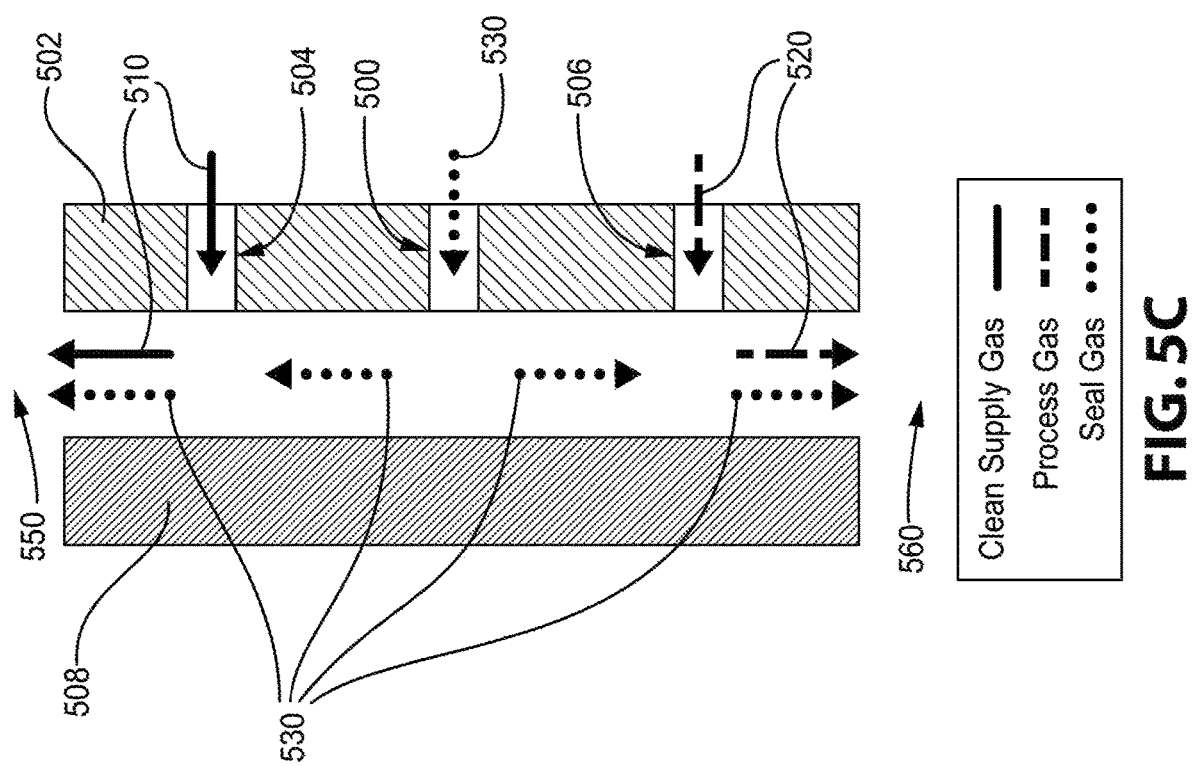
FIG. 5C is a cross-sectional view of the orifice air flow direction in the journal and thrust gas bearing of FIG. 3 with higher seal gas pressure.

With reference to FIGS. 5A-5C, an example of the pressure control of the gases passing into different orifices to allow for the control of the direction and amount of leakage within a bearing 502 is shown. The bearing 502 shown in FIGS. 5A-5C has the same or a substantially similar construction to the bearing 202 described above with reference to FIGS. 3 and 4. Gases may be supplied into the bearing 502 through at least one outboard orifice 504 and at least one inboard orifice 506. The gas may create a gap between a rotating member 508, such as the rotor 208 or the shaft 210 described above with reference to FIGS. 3 and 4, and the inner surface of the bearing 502. Clean air gas 510 may be supplied into the bearing 502 through the at least one outboard orifice 504. Process gas 520 may be supplied into the bearing 502 through the at least one inboard orifice 506. As shown in FIG. 5A, the pressure of the clean air gas 510 may be higher than the pressure of the process gas 520. When the pressure of the clean air gas 510 is higher than the pressure of the process gas 520, the clean air gas 510 may prevent the process gas 520 from leaking out of the bearing 502 into the atmosphere 550.

As shown in FIG. 5B, the pressure of the process gas 520 may be higher than the pressure of the clean air gas 510. When the pressure of the process gas 520 is higher than the pressure of the clean air gas 510, the process gas 520 may prevent the clean air gas 510 from leaking into the turbomachine 560. This may cause all of the clean air gas 510 to be leaked to the atmosphere 550. According to an example, the higher pressure of the process gas 520 may prevent the clean air gas 510 from leaking further into the bearing, beyond the at least one inboard orifice 506.

As shown in FIG. 5C, a seal gas 530 may be injected into the bearing 502 through at least one seal gas orifice 500. The at least one seal gas orifice 500 may be located between the at least one outboard orifice 504 and the at least one inboard orifice 506. The seal gas 530 may be a gas that is not the clean air gas 510 or the process gas 520. The injection of the seal gas 530 may be used to control the leakage of the process gas 520 and the clean air gas 510. The seal gas 530 may have a higher pressure than the clean air gas 510 and the process gas 520. When the seal gas 530 has a higher pressure than the clean air gas 510 and the process gas 520, the seal gas 530 may prevent the process gas 520 from leaking out of the bearing into the atmosphere 550. The seal gas 530 may also prevent the clean air gas 510 from leaking into the turbomachine 560. According to an example, the higher pressure of the seal gas 530 may prevent the clean air gas 510 from leaking further into the bearing 502, beyond the at least one seal gas orifice 500. The seal gas 530 may create a barrier between the clean air gas 510 and the process gas 520, keeping the clean air gas 510 and process gas 520 separated.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what are currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that to the extent possible, one or more features of any embodiment or aspect can be combined with one or more features of any other embodiment or aspect.

The invention claimed is:

1. A bearing, comprising:
    a thrust gas bearing attached to a journal bearing; and
    two or more converging-diverging orifices defined in a surface of at least one of the thrust gas bearing and the journal bearing,
    wherein the converging-diverging orifices supply at least one pressurized gas to an interior of the bearing, and
    wherein the thrust gas bearing is configured to accommodate a hydrostatic injection of the at least one pressurized gas to form a gas seal within the thrust gas bearing.

2. The bearing according to claim 1, wherein the at least one pressurized gas comprises a process gas.

3. The bearing according to claim 1, wherein the converging-diverging orifices each comprise a throat, each orifice being configured to cause a flow of the at least one pressurized gas in the throat of the orifice to have a velocity of Mach 1 and to cause a flow of the at least one pressurized gas beyond the throat to have a supersonic velocity.

4. The bearing according to claim 1, wherein the thrust gas bearing comprises hydrodynamic lifting grooves on a surface of the thrust gas bearing, the hydrodynamic lifting grooves being configured to create a gas seal.

5. The bearing according to claim 1, wherein an edge of an inner surface of the journal bearing comprises a plurality of grooves defined therein, the grooves having a geometry that creates a high pressure region at the edge of the journal bearing.

6. The bearing according to claim 1, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and
    wherein when the process gas has a higher pressure than the clean air gas, the process gas prevents the clean air gas from leaking into the bearing.

7. The bearing according to claim 1, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and
    wherein when the clean air gas has a higher pressure than the process gas, the clean air gas prevents the process gas from leaking out of the bearing.

8. The bearing according to claim 1, wherein the converging-diverging orifices comprise at least one inboard orifice, at least one outboard orifice, and at least one seal gas orifice located between the at least one inboard orifice and the at least outboard orifice, and the at least one pressurized gas comprises a process gas supplied through the at least one inboard orifice, a clean air gas supplied through the at least one outboard orifice, and a seal gas supplied through the at least one seal gas orifice, and
    wherein when the seal gas has a higher pressure than the process gas and the clean air gas, the seal gas prevents the process gas from leaking out of the bearing.

9. The bearing according to claim 1, wherein a metal mesh damper is provided on an outside surface of the bearing.

10. A turbomachine, comprising:
    a casing having an inlet end and an outlet end opposite the inlet end along a longitudinal axis of the casing;
    a shaft disposed within the casing, the shaft extending from the inlet end to the outlet end of the casing;
    at least one rotor extending radially outward from the shaft; and
    at least one bearing, the at least one bearing comprising:
        a thrust gas bearing attached to a journal bearing; and
        two or more converging-diverging orifices defined in a surface of at least one of the thrust gas bearing and the journal bearing,
        wherein the converging-diverging orifices supply at least one pressurized gas to an interior of the bearing,
        wherein the rotor is encased within the thrust gas bearing,
        wherein the shaft is at least partially encased within the journal bearing, and
        wherein the thrust gas bearing is configured to accommodate a hydrostatic injection of the at least one pressurized gas to form a gas seal within the thrust gas bearing.

11. The turbomachine according to claim 10, wherein the at least one pressurized gas comprises a process gas.

12. The turbomachine according to claim 10, wherein the converging-diverging orifices each comprise a throat, each orifice being configured to cause a flow of the at least one pressurized gas in the throat of the orifice to have a velocity of Mach 1 and to cause a flow of the at least one pressurized gas beyond the throat to have a supersonic velocity.

13. The turbomachine according to claim 10, wherein the thrust gas bearing comprises hydrodynamic lifting grooves on a surface of the thrust gas bearing, the hydrodynamic lifting grooves being configured to create a gas seal.

14. The turbomachine according to claim 10, wherein an edge of an inner surface of the journal bearing comprises a plurality of grooves defined therein, the grooves having a geometry that creates a high pressure region at the edge of the journal bearing.

15. The turbomachine according to claim 10, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the process gas has a higher pressure than the clean air gas, the process gas prevents the clean air gas from leaking into the bearing.

16. The turbomachine according to claim 10, wherein the converging-diverging orifices comprise at least one inboard orifice and at least one outboard orifice and the at least one pressurized gas comprises a process gas supplied through the at least one inboard orifice and a clean air gas supplied through the at least one outboard orifice, and wherein when the clean air gas has a higher pressure than the process gas, the clean air gas prevents the process gas from leaking out of the bearing.

17. The turbomachine according to claim 10, wherein the converging-diverging orifices comprise at least one inboard orifice, at least one outboard orifice, and at least one seal gas orifice located between the at least one inboard orifice and the at least outboard orifice, and the at least one pressurized gas comprises a process gas supplied through the at least one inboard orifice, a clean air gas supplied through the at least one outboard orifice, and a seal gas supplied through the at least one seal gas orifice, and wherein when the seal gas has a higher pressure than the process gas and the clean air gas, the seal gas prevents the process gas from leaking out of the bearing.

18. The turbomachine according to claim 10, further comprising a metal mesh damper provided on an outside surface of the bearing.

\* \* \* \* \*